United States Patent Office 2,773,701
Patented Dec. 11, 1956

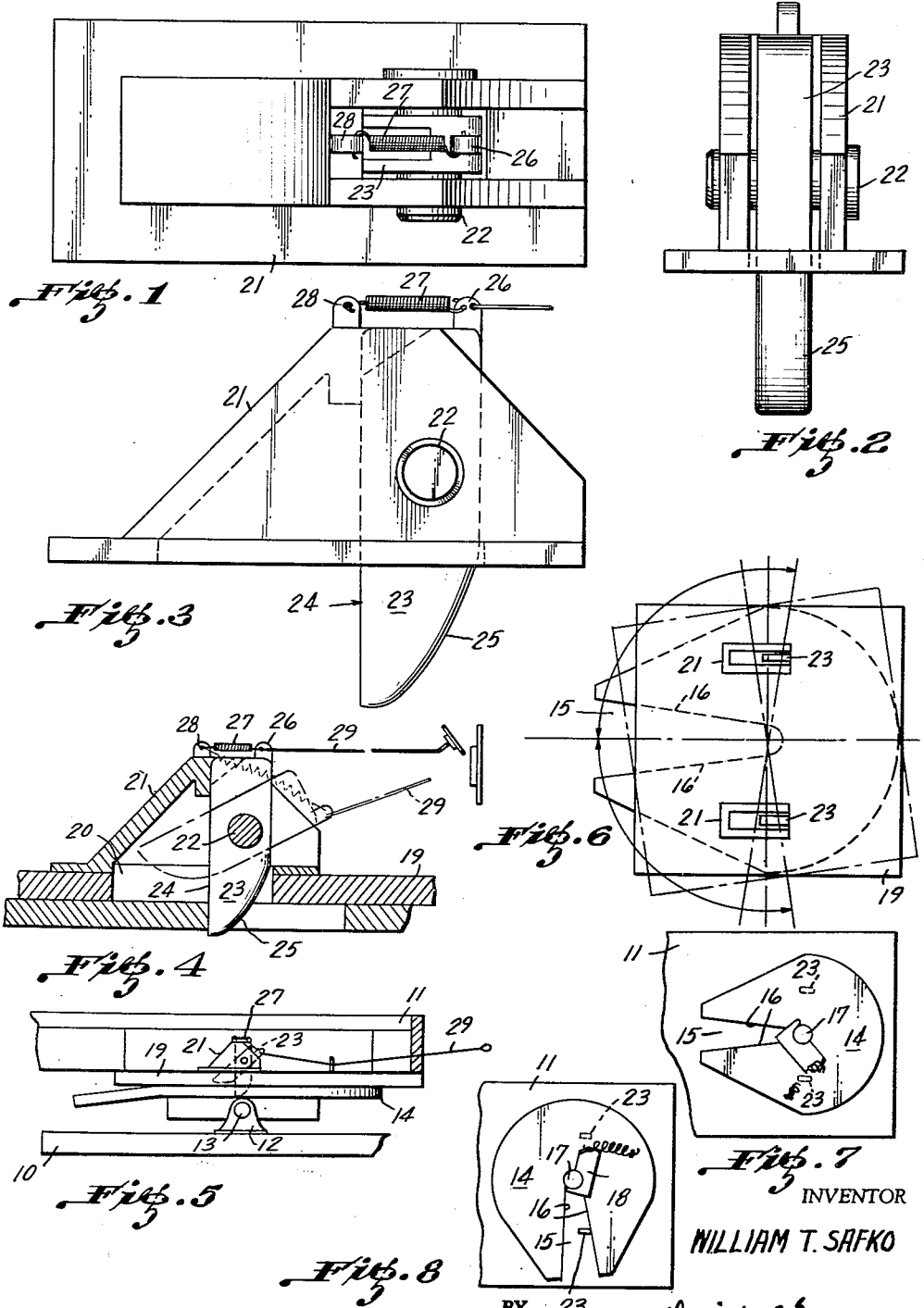

2,773,701

SAFETY DEVICE FOR TRACTOR-TRAILER FIFTH WHEEL

William T. Safko, Short Hills, N. J.

Application March 25, 1955, Serial No. 496,820

4 Claims. (Cl. 280—432)

This invention is a tractor-trailer hook-up, having particular reference to means for coupling adjacent ends of the tractor and trailer in such manner as to permit free normal movements of said ends with respect to each other, but providing means for locking the joined ends of the tractor and trailer from further angular movement with respect to one another when a predetermined angle has been reached.

The primary object of the invention is to provide means, wholly automatic in nature, to limit the angular lateral movement of the tractor and trailer with respect to one another when "jackknifing" occurs, that is the tractor turning at an excessive angle relative to the trailer.

A further object is to provide means for locking the relative lateral angular movements of the tractor with respect to the trailer to prevent damage to either or both the cab and body or occupants or goods of either.

A further object of the invention is to provide automatic means for limiting the angularity of the tractor with respect to the trailer when the danger point has been reached, which requires no change or alteration in that part of the hitch carried by the tractor, which provides simple means easily and inexpensively attached to the trailer for bringing about the automatic locking operation when the danger angle has been reached, which enables the coupled vehicles to be "straightened out" automatically when travel is to be continued, and which is so constructed as to enable the operator to quickly and easily couple the tractor to the trailer at any desired angle.

With the foregoing objects in view, together with others which will appear as the description proceeds, the invention resides in the novel construction, combination and arrangement of parts, all as will be described more fully hereinafter, illustrated in the drawings, and particularly pointed out in the claims.

In the drawing:

Fig. 1 is a top plan view of the pawl assembly used in carrying out the invention, Fig. 2 is a rear elevation of the assembly shown in Fig. 1, Fig. 3 is a side elevation of the assembly of Fig. 1, Fig. 4 is a fragmentary sectional view illustrating the pawl assembly as it will appear with the pawl in locked position, Fig. 5 is a side elevation, parts broken away, showing the parts in the position they will assume under normal driving conditions, Fig. 6 is a diagrammatic plan view of the trailer plate and fifth wheel plate and showing the location of the locking pawls with respect to both of these elements, Fig. 7 is a diagrammatic bottom plan view of the fifth wheel plate showing its normal position with respect to the trailer body, and Fig. 8 is a view similar to Fig. 7 and showing the action of a pawl in locking engagement with the fifth wheel just prior to the danger angle between the tractor and the trailer being reached.

Referring now more particularly to the drawing, reference is first made to Figs. 4 to 8 inclusive. Fig. 5 shows the rear end of the tractor indicated at 10 and the overlying coupled forward end of the trailer represented at 11. The rear end of the tractor is usually provided with a pair of spaced bearing saddles 12 to rockably receive pins 13 supporting the coupler base or fifth wheel indicated at 14. This fifth wheel is of the usual shape and construction as indicated more particularly in Figs. 6 to 8 inclusive, including the slot 15 extending inwardly from the rear of the plate and providing walls or edges 16 diverging from the center of the fifth wheel plate to the rear edge thereof. This arrangement permits the kingpin 17 depending from the forward end of the trailer to be coupled in the usual manner to the fifth wheel, being locked therein by suitable means indicated here conventionally as the spring urged securing member or latch 18. It will be understood that the fifth wheel construction is conventional and no alteration or variation in its arrangement is necessary so long as it provides the usual coupling slot 15 extending inwardly from the rear edge of the fifth wheel plate.

The forward end of the trailer 11 is provided with a bearing plate indicated at 19 which carries the depending coupling pin 17. This plate may be a part of the forward end of an existing trailer body or may be added thereto by suitable welding processes as will be understood. This plate rests upon the underlying flat fifth wheel plate 14. The bearing plate is provided with a pair of spaced slots 20 extending entirely therethrough, one on each side of the kingpin laterally of the trailer body. Over each of these openings is secured, as by welding or any suitable means, a pawl housing indicated at 21. Each housing has arranged transversely therein a pivot pin 22 rigidly secured to a pawl 23 inwardly from the ends of the latter. Each pawl is provided near its lower end with an abrupt rear face or edge 24 and a bevelled front face 25. The upper end of each pawl has secured thereto as at 26 one end of a compression spring 27, the opposite end of the spring being secured as at 28 to a lug projecting upwardly from the housing 21. A chain, cable or other manipulating member 29 is secured to the front of the upper end of the pawl and leads to the forward end of the trailer body to be manually operated to swing the pawl to the position indicated by dotted lines in Fig. 4 when desired. The spring 27 tends to maintain the pawl in the position shown in Figs. 2, 3 and 4, that is, with the lower end thereof projecting below the lower face of the bearing plate 19.

In coupling the tractor to the trailer, the former is backed beneath the forward end of the trailer in such manner that the kingpin 17 depending from the trailer body will enter the diverging slot 15 until the base of the slot has been reached, whereupon it is locked in the usual manner. Due to the fact that the forward edges 25 of the pawls are bevelled, they will ride up on the top surface of the fifth wheel plate 14, being held with their forward bevelled edges in frictional contact with the smooth upper surface of the fifth wheel plate by the compression springs 27. The pawls as well as the slots 20 will be so positioned laterally of the bearing plate 19 as to permit the usual lateral oscillating movements of the adjoining ends of the tractor and trailer, the bevelled faces 25 of the pawls at all times riding freely upon the upper face of the fifth wheel 14. However, the location of the pawls is such that when excessive or dangerous angularity between the tractor and the trailer occurs, their lower ends will drop into the slot 15 in the fifth wheel and continued angular movement will be arrested by the rear abrupt end 24 of the pawl engaging with the side wall of the slot 15, thus locking the fifth wheel to the forward end of the trailer against any further movement in that direction. The pawls are to be located at such position that this locking engagement occurs just prior to the danger point being reached in the angular relationship between the tractor and the trailer. In "straightening out" the trailer-tractor combination, the tractor is steered around into a proper aligning position with respect to the trailer, and as the fifth wheel turns in this reverse direction, the forward bevelled face 25 of the pawl will ride upon the opposite edge 16 of the slot 15 and will come to rest under spring tension on the upper smooth surface of the fifth wheel. It is therefore evident that no manual operation of either pawl will be required under these normal operating conditions.

In instances where the initial coupling between the rear end of the tractor and the forward end of the trailer is attendant upon a peculiar or unusual angular relationship between these members, it may become necessary to retract one or both of the pawls 23 in order that this may be accomplished. In such instance, the cord or chain 29 may be pulled to move the pawl upon its pivot 22 to such position as is indicated by the dotted lines in Figs. 4 and 5 until the coupling has been accomplished, after which the cords are released so that the pawls then freely ride at their lower ends upon the upper smooth surface of the fifth wheel.

It is apparent from the structure described that no change, alteration or addition to the conventional tractor fifth wheel member is required, and very little addition is necessary to equip the forward end of the trailer with the structure of my invention. It will be understood that the location of the pawls with respect to the fifth wheel and the coupling slot will depend upon the structure and arrangement of the fifth wheel so that the pawls will properly operate to engage either wall 16 of the coupling slot 15 just prior to the angular danger point being reached. If the critical angular relationship between the truck and trailer is greater than 90 degrees, the pawls will be located slightly in advance of the transverse center of the kingpin, while if this relationship be less than 90 degrees, the pawls will be located either on the transverse center line of the kingpin or slightly rearwardly thereof. The location of the pawls, therefore, will be determined by that degree of angularity between the truck and the trailer it is desired they become active or operative.

I claim:

1. In a tractor-trailer combination, a tractor having a fifth wheel member including a flat body portion having a guide slot extending inwardly from its rear end and a trailer having a coupler base with a depending kingpin to engage in said slot; said base having a pair of openings therein spaced equal distances one on each side of said kingpin laterally of said base, a pawl hingedly connected inwardly from its ends above said coupler base with its lower end extending through each of said openings and resting upon said fifth wheel plate, means yieldably urging said pawls into engagement with said fifth wheel plate, and selective means for manually retracting said pawls, one of said pawls adapted to project into and engage a wall of said slot when the movement of the fifth wheel with respect to the coupler base brings the pawl opening in alignment with said slot.

2. In a tractor-trailer combination, a tractor having a fifth wheel member including a flat body portion having a guide slot extending radially inwardly from its rear end and a trailer having a coupler base at its forward end with a depending kingpin to engage in said slot; said base having a pair of openings therein spaced equal distances one on each side of said kingpin at substantially 90 degrees to the center line of said guide slot and spaced radially outward from said kingpin beyond the inner end of said slot, pawls hingedly connected inwardly from their ends above said coupler base with their lower end extending respectively through each of said openings and resting upon said fifth wheel plate, means yieldably urging said pawls into engagement with said fifth wheel plate, said pawls adapted to project into said slot and to engage the walls thereof when movements of the plate and fifth wheel relatively to one another bring said openings and fifth wheel slot into alignment with one another and selective means for manually retracting said pawls.

3. In a tractor-trailer combination, a tractor having a fifth wheel member including a flat plate having a guide slot with angular side walls extending inwardly from its rear end and a trailer having a coupler base with a depending kingpin to engage in said slot, said base having a pair of openings therein spaced equal distances one on each side of said kingpin laterally of said base whereby said openings are adapted to move over said guide slot when the fifth wheel plate and base rotate relative to one another, a pawl hingedly connected inwardly from its ends above each of said openings in said coupler base with its lower end resting upon said flat plate, the forward faces of said pawls being inclined outwardly from the lower ends thereof, means for yieldingly urging said pawls with their inclined faces in engagement with said fifth wheel plate, whereby when said openings overlie said guide slot said pawls will drop into said slot and engage the side walls thereof, and selective means for manually retracting said pawls.

4. In a tractor-trailer combination, a tractor having a fifth wheel member including a flat plate having a guide slot extending inwardly from its rear end to the center thereof and a trailer having a coupler base with a kingpin to engage in said slot and to rest in the center of said plate, said base having a pair of openings therein spaced equal distances one on each side of said kingpin laterally of said trailer whereby said openings are adapted alternately to overlie said slot when said fifth wheel member and said coupler rotate with respect to one another, a pawl housing mounted over each of said openings, a pawl pivoted inwardly from its ends in each of said housings, spring means tending normally to hold said pawls with their lower ends projected through said openings and into engagement with said plate, whereby when neither of said openings overlies said guide slot the pawl will drop from said plate into said guide slot and in engagement with the lateral edges thereof the forward surfaces of said pawls being bevelled at their lower ends, and selective means for manually retracting said pawls.

References Cited in the file of this patent

UNITED STATES PATENTS

| | | |
|---|---|---|
| 2,048,310 | Wohldorf | July 21, 1936 |
| 2,073,269 | Skibbe | Mar. 9, 1937 |
| 2,454,626 | Borzell | Nov. 23, 1948 |